(12) United States Patent
Zaitsu et al.

(10) Patent No.: US 8,647,464 B2
(45) Date of Patent: Feb. 11, 2014

(54) METHOD FOR MANUFACTURING RESIN MOLDING

(75) Inventors: Yoshihiro Zaitsu, Tokyo (JP); Kazuaki Hokoda, Tokyo (JP); Tatsuya Umeyama, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 174 days.

(21) Appl. No.: 13/021,681

(22) Filed: Feb. 4, 2011

(65) Prior Publication Data

US 2011/0203726 A1    Aug. 25, 2011

(30) Foreign Application Priority Data

Feb. 4, 2010   (JP) .................................. 2010-023103

(51) Int. Cl.
  *B32B 37/00* (2006.01)
(52) U.S. Cl.
  USPC ....................................................... 156/272.8
(58) Field of Classification Search
  USPC ............ 156/272.2, 272.8; 219/121.6, 121.63, 219/121.64, 121.76, 121.78, 121.79, 121.8
  See application file for complete search history.

(56) References Cited

U.S. PATENT DOCUMENTS

| | | | | |
|---|---|---|---|---|
| 6,444,946 B1 * | 9/2002 | Korte | ........................ | 219/121.6 |
| 6,464,374 B2 | 10/2002 | Akiyama et al. | | |
| 6,478,451 B2 | 11/2002 | Akiyama et al. | | |
| 6,592,239 B1 | 7/2003 | Akiyama et al. | | |
| 2001/0028568 A1 * | 10/2001 | Akiyama et al. | ............... | 362/520 |
| 2005/0030751 A1 * | 2/2005 | Matsunaga et al. | ............ | 362/267 |
| 2005/0266762 A1 * | 12/2005 | Yasuda et al. | .................... | 445/23 |
| 2007/0295719 A1 * | 12/2007 | Yamazaki et al. | ........... | 220/4.01 |

FOREIGN PATENT DOCUMENTS

| | | | |
|---|---|---|---|
| JP | 10-310676 | A | 11/1998 |
| JP | 2000-294013 | A | 10/2000 |
| JP | 2001-243811 | A | 9/2001 |
| JP | 2001-243812 | A | 9/2001 |
| JP | 2004327332 | A * | 11/2004 |
| JP | 2004-349123 | A | 12/2004 |

OTHER PUBLICATIONS

Machine Translation of JP 2004327332 A; Nov. 2004.*

* cited by examiner

*Primary Examiner* — Daniel McNally
(74) *Attorney, Agent, or Firm* — Kenealy Vaidya LLP

(57) ABSTRACT

A method for manufacturing a resin molding that uses a laser beam can provide a high level of adhesion, an excellent appearance, and can include very strong welded portions. The method can include preparing a light-transmitting resin member having a protruding portion formed on a rear surface of the light-transmitting resin member and having an end surface, the protruding portion having both side surfaces having asymmetric inclination angles with respect to the normal of the end surface of the protruding portion. The method can also include arranging and pressing together the end surface of the protruding portion that is a welded region of the light-transmitting resin member, and a welded region of a corresponding light-absorbing resin member so that they are opposed to each other. A laser beam can be emitted from a laser light source to be incident on a surface of the light-transmitting resin member while the laser beam is refracted. The method can also include repeatedly irradiating the laser beam onto the welded regions to heat and fuse the entire welded regions to weld the light-transmitting resin member and the light-absorbing resin member while opposed to each other and pressed together, wherein the inclination angle of the side surface of the protruding member near the laser light source is equal to or more than a travel angle of the refracted laser beam.

17 Claims, 5 Drawing Sheets

METHOD FOR MANUFACTURING RESIN MOLDING

This application claims the priority benefit under 35 U.S.C. §119 of Japanese Patent Application No. 2010-023103 filed on Feb. 4, 2010, which is hereby incorporated in its entirety by reference.

TECHNICAL FIELD

The presently disclosed subject matter relates to a method for manufacturing a resin molding.

BACKGROUND ART

Conventional vehicle lights can have a resin molding which includes a housing formed from a light-absorbing resin such as acrylonitrile styrene acrylate (ASA) and a lens that is formed from a light-transmitting resin such as a polymethylmethacrylate (PMMA) or a polycarbonate and is welded to the housing.

Japanese Patent Application Laid-Open No. 2000-294013 (corresponding to U.S. Pat. No. 6,592,239) proposes a laser welding method. In this method, a lens is pressed against a lamp body (housing) together and then the entire circumference of the lens is scanned with a laser beam using a robot with a laser beam to be incident on the lens, thereby heating and fusing the surface of the lamp body as well as fusing the ends of the seal support legs of the lens by means of the fusing heat of the lamp body.

Japanese Patent Application Laid-Open No. 2001-243811 (corresponding to U.S. Pat. No. 6,464,374) proposes a vehicle light wherein a front lens and a lamp body are directly bonded by means of laser welding. In this vehicle light, seal support legs which extend in the bonding direction are formed on the outer peripheral edge of the surface of the front lens while an abutment surface that makes contact with the end surface of the seal support legs is formed on the lamp body. A laser light receiving surface that guides a laser beam being incident from a direction diagonal to the bonding direction is formed protruding on the outer surface of the seal support legs. The laser light receiving surface is also formed as a flat surface slanting towards the bonding direction at the ends of the seal support legs such that the ends of the seal support legs are curved towards the outside extending in the bonding direction.

However, a method of welding a resin molding using a laser beam has not been fully developed as of yet.

A method for manufacturing a resin molding that uses a laser beam, has a high level of adhesion, an excellent appearance, and includes very strong welded portions is still highly demanded.

SUMMARY

The presently disclosed subject matter was devised in view of these and other problems and features and in association with the conventional art. According to an aspect of the presently disclosed subject matter, a method for manufacturing a resin molding is provided, the method including:

a) preparing a light-transmitting resin member having a protruding portion formed on a rear surface of the light-transmitting resin member and having an end surface, the protruding portion having both side surfaces having asymmetric inclination angles with respect to the normal of the end surface of the protruding portion;

b) arranging and pressing the end surface of the protruding portion that is a welded region of the light-transmitting resin member, and a welded region of a corresponding light-absorbing resin member so that they are opposed to each other, and then causing a laser beam emitted from a laser light source to be incident on a surface of the light-transmitting resin member while the laser beam is refracted; and c) repeatedly irradiating the laser beam onto the welded regions to heat and fuse the entire welded regions to weld the light-transmitting resin member and the light-absorbing resin member while opposed to each other and pressed together, wherein the inclination angle of the side surface of the protruding member near the laser light source is equal to or more than a travel angle of the refracted laser beam.

The presently disclosed subject matter can provide a manufacturing method of a resin molding that can effectively eliminate gaps by means of uniformly irradiating a laser beam onto the welded regions.

In the method for manufacturing a resin molding, the inclination angle of the side surface of the protruding member near the laser light source may be over 0° and equal to or less than 40°.

In the method for manufacturing a resin molding, the side surface of the protruding member near the laser light source can be a curved surface.

In the method for manufacturing a resin molding, in the above step c) the laser beam can be scanned using a Galvano scanner.

In the method for manufacturing a resin molding, in the above step c) when an angle of incidence of the laser beam on the welded region is varied depending on a position where the laser beam is incident, a scanning speed of the laser beam can be varied to equalize heating temperatures within the welded region.

In the method for manufacturing a resin molding, in the above step c) when an angle of incidence of the laser beam on the welded region is varied depending on a position where the laser beam is incident due to a single laser beam utilized, a plurality of laser beams can be utilized to equalize heating temperatures within the welded region.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to a method for manufacturing a resin molding of the presently disclosed subject matter with reference to the accompanying drawings in accordance with exemplary embodiments.

When a light-transmitting (clear) resin member and a light-absorbing (light-absorbing, opaque) resin member are arranged to be opposite to each other and pressed together making contact with each other and a laser beam is irradiated from the light-transmitting resin member side, the laser beam can pass through the light-transmitting resin member to reach the light-absorbing resin member. When the laser beam is absorbed by the light-absorbing resin member, the light-absorbing resin member can be heated, softened and then fused. Because the light-transmitting resin member makes contact with the light-absorbing resin member under pressure, the heat of the light-absorbing resin member can be conducted to the light-transmitting resin member especially at the contact region. Therefore, the light-transmitting resin member can be softened thereby increasing the contact region and eventually fusing the light-transmitting resin member as well. Both members can then be fused and welded (adhered) together.

In general, for a resin molding such as a vehicle light, a laser beam is scanned while continuously welding resin members under pressure along the peripheries where the members are pressed to make contact with each other. The inventors investigated a welding method that repeatedly irradiates a laser beam during a high-speed scan along a welded region set to the periphery of a workpiece and almost simultaneously heats and fuses the entire welded region so as to weld the resin members together. A Galvano scanner can be one exemplary means that allows a laser beam to be scanned at a high speed.

Figure 1A:
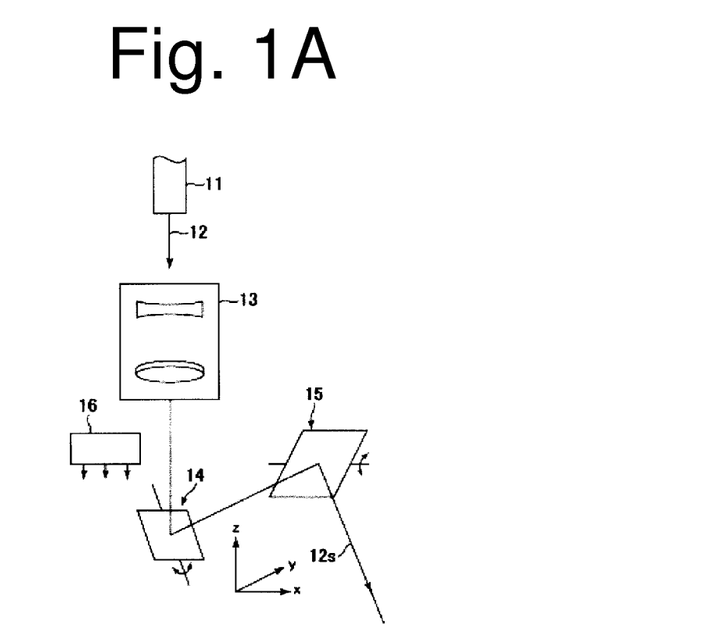
FIGS. 1A to 1D are a diagram showing a welding process by means of repeated irradiation of a laser beam, a perspective view of an irradiated workpiece, a temperature chart with respect to the laser irradiation time, and a cross sectional view illustrating how the welded ribs are formed in a light-transmitting resin member, respectively.

FIG. 1A is a diagram that schematically shows the configuration of a laser beam welding apparatus using a Galvano scanner. Assume an xyz orthogonal coordinate system. The xy plane, for example, forming a horizontal plane, that includes a reference plane for supporting the workpiece. An optical system 13 can be arranged to adjust the focal point with respect to a laser beam 12 emitted from the end of an optical fiber 11 connected to a laser oscillator. The focal point adjustment optical system 13 can include a movable lens that can adjust the focal point on the optical path. A first Galvano mirror 14 can be arranged with respect to the laser beam emitted from the focal point adjustment optical system 13 so that the laser beam can scan the work surface in the x-direction, for example. A second Galvano mirror 15 can be arranged with respect to the laser beam reflected by the first Galvano minor 14 so that the laser beam can scan the work surface in the y-direction, for example.

A control unit 16 can control the Galvano mirrors 14 and 15 and the focal point adjustment optical system 13. An emitted laser beam 12s can perform an xy scan within a two-dimensional plane by means of the Galvano minors 14 and 15. In addition, the focal length can be controlled, so that the focal point can be moved in the z direction by means of adjusting the focal point adjustment optical system 13. In other words, the focusing position of the laser beam can be scanned three-dimensionally. If the scanning is only in two dimensions, a scanning head with a fθ lens can be used instead of the focal point adjustment optical system 13. Galvano mirrors are lightweight allowing high-speed scanning, and accordingly, are suitable for this purpose.

Figure 1B:
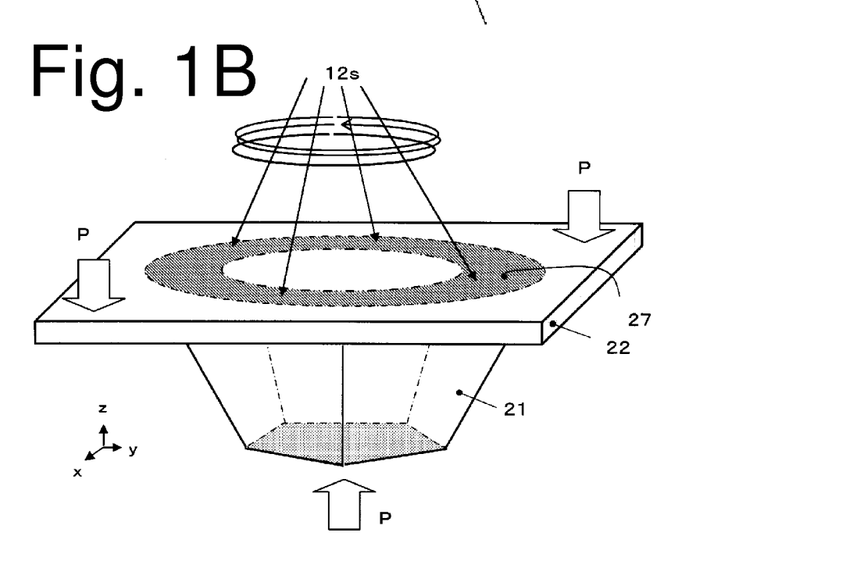

FIG. 1B is a schematic diagram showing a repeated laser welding process on a workpiece that has a two-dimensional welded region arranged within the xy plane. A lens 22 formed from a light-transmitting resin can be arranged opposite to a container-shaped housing 21 formed from a light-absorbing resin so as to close the opening of the housing 21. The lower surface of the lens 22 and the upper surface of the housing 21 are brought into contact under pressure with each other by a pressure P along the z-direction. The laser beam 12s can pass through the lens 22 from above in the z-direction, thereby irradiating the upper surface of the housing 21. The laser beam 12s can have a beam diameter corresponding to the width of the welded region 27, for example. The irradiation position is repeatedly scanned along the welded region 27 by means of driving the Galvano minors. In the configuration of FIG. 1A, the first Galvano mirror 14 may scan the x-direction and the second Galvano minor 15 may scan the y-direction.

Figure 1C:
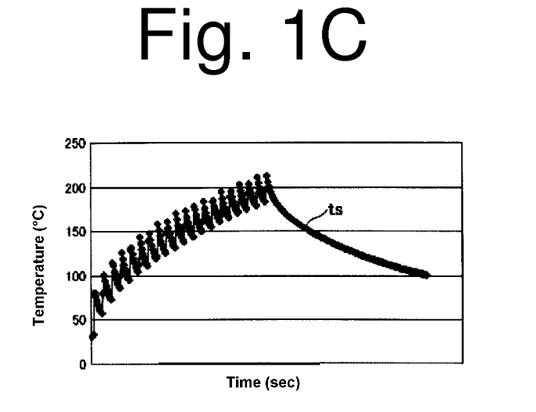

FIG. 1C is a graph schematically showing time variations of temperature in the laser irradiation position. The temperature rises for a single laser beam irradiation and starts to fall after the completion of the irradiation. Before cooling to the temperature before the irradiation, the next laser beam is irradiated and the temperature rises again. The average temperature gradually rises by means of the repeated laser beam irradiation. If the position within the welded region changes, similar temperature changes will occur in the form of slightly shifted timing. The entire welded region can be heated almost uniformly and almost at the same time for obvious reasons.

Normally, there are fine irregularities, which occur during the molding, existing on the surfaces of the housing 21 and the lens 22. Because of this, localized gaps may exist between the resin members. If the entire welded region is in a fused state, both of the resins will melt and blend together and the gaps will effectively disappear due to the pressure thereby making it possible to obtain a strong welding.

Since the laser light source is fixed during the welding process using the Galvano scanner, the laser beam can be incident by an angle (angle of incidence) with respect to the normal of the surface of the lens.

Figure 1D:
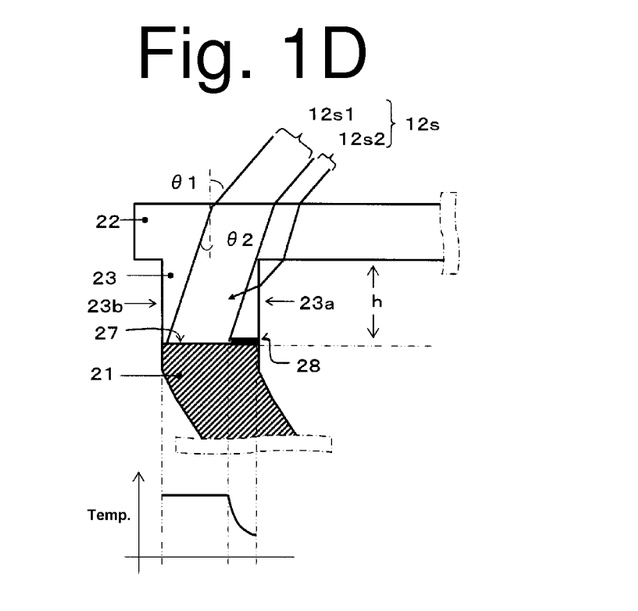

FIG. 1D is a cross-sectional view showing the workpiece having a protruding portion (for example, a rib) 23 for welding, formed on the rear surface of the lens 22. Namely, a rib 23 with a height of h can be formed on the rear surface of the lens 22 and can have an inner side surface 23a and an outer side surface 23b. Then, the laser beam 12s with a certain beam diameter can be irradiated onto the workpiece. A laser beam 12s1 or one portion of the laser beam 12s can be incident on the surface of the lens 22 at an angle of incidence θ1 and enters, and is refracted by a refraction angle θ2. The refracted light can travel through the lens 22 and the rib 23 and reach the welded region 27. In contrast, after a laser beam 12s2 (one portion of the laser beam 12s) is incident on the surface of the lens 22, it can be emitted into the atmosphere from the rear surface of the lens 22 and can be incident again on the side surface 23a of the rib 23 while the optical path changes. Therefore, the laser beam does not reach a predetermined irradiation position within the welded region 27. For this reason, the laser beam 12s causes a shadow 28 to occur where it is not irradiated on the inner peripheral side of the welded region 27.

Because there is no heat generated due to the light absorption of the light-absorbing resin member in the shadow located in the welded region, significant variations in the temperature that can be reached are present within the welded region as schematically illustrated in the figure. When the resin member in the shadow does not reach a fused state due to the lack of heat, effective elimination of gaps by means of pressure will not occur resulting in the possibility of poor welding. This shadow region becomes wider as the angle of incidence θ1 of the laser beam 12s increases or as the height h of the rib 23 becomes higher. Therefore, there may be constraints on the design and manufacture of workpieces.

In order to ensure welding strength due to an effective gap elimination, the entire welded region can be uniformly irradiated with a laser beam and variations in the temperature reached can be controlled. The inventors investigated the structure of a workpiece effective for obtaining a uniform temperature in the welded region during the welding process using the Galvano scanner. For example, the occurrence of shadows in the welded region can be prevented from occurring by leaning the side surfaces of the rib toward the light source.

Figure 2A:
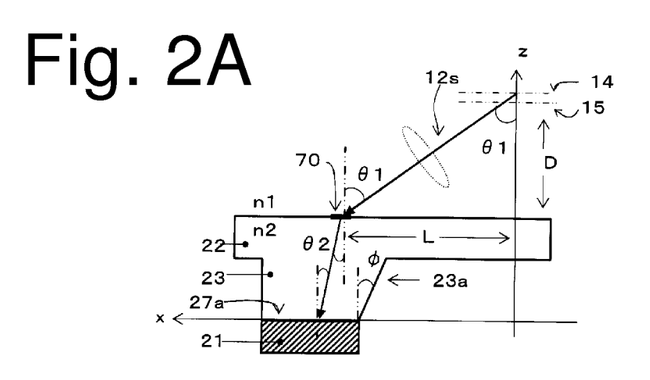
FIGS. 2A to 2C are cross sectional views showing a case where the side surface of the welded rib is inclined with respect to the welded surface during the welding process which is accomplished by means of repeated irradiation of a laser beam.

FIG. 2A is a diagram in which virtual xyz coordinate axes are set during the laser welding process using the Galvano scanner. The optical system shown here can be configured such that the reflection on a Galvano minor is straightforwardly achieved. It is possible to consider the laser beam incident position on the first Galvano minor 14 as the position of a virtual light source and also to consider the laser beam 12s scanning the irradiation position along the welded region 27a by means of rotating the Galvano minors 14 and 15. The position of the virtual light source can be set on the z axis and the welded region 27a can be set within the xy plane. The surface of the lens 22 can be formed by a plane parallel to the xy plane. The laser beam 12s that has a certain beam diameter can be discharged from the virtual light source at a height of D from the surface of the lens 22. The laser beam can be incident on a lens irradiation surface 70, positioned at a distance of L from the z axis (horizontal distance), at an angle of incidence θ1 and after being refracted at an angle of refraction θ2, the refracted light travels through the lens 22 and the rib 23 irradiating the welded surface 27a (which is a contact surface of the rib 23 and the housing 21) at an angle almost equal to the angle of refraction θ2 (travel angle). The inner side surface 23a of the rib 23 can be slanted with respect to the normal of the welded surface 27a at an angle φ. At this time, if the inclination angle φ is equal to or more than the travel angle of the refracted light, the laser beam 12s that is incident on the lens 22 will not be emitted into the atmosphere but can uniformly reach the welded surface 27a.

The refraction angle or the travel angle θ2 of the refracted light is associated with D and L and the refractive indices of the atmosphere and the lens.

θ1 can be represented by the following equation based on D and L:

$$\tan\theta1 = L/D.$$

In addition, from the Pythagorean theorem, the following equation can be formed, $$\sin\theta1 = L/\sqrt{(L^2+D^2)} \qquad \text{(equation 1)}.$$

Furthermore, if the refractive index n1 of the atmosphere and the refractive index n2 of the lens 22 are considered, the angle of incidence θ1 and the angle of refraction θ2 are associated according to Snell's law and represented by the following equation:

$$n1 \times \sin\theta1 = n2 \times \sin\theta2 \qquad \text{(equation 2)}.$$

From equation 1 and equation 2, $$n1 \times (L/\sqrt{(L^2+D^2)}) = n2 \times \sin\theta2$$

and to clarify θ2, $$\theta2 = \sin^{-1}((n1/n2) \times (L/\sqrt{(L^2+D^2)})) \qquad \text{(equation 3)}.$$

From equation 3, θ2 is associated with the height D from the surface of the lens to be irradiated by the laser beam up to the light source, the distance L from the light source projected onto the surface of the lens up to the laser irradiation position, and the refractive indices of the atmosphere and the lens n1 and n2.

During an actual welding process, if the virtual light source position can be determined for the workpiece in advance, the D and L can be determined. Even further, the refractive index of the light-transmitting resin member used for a common vehicle light, such as PMMA, is already known. Therefore, it is possible to estimate the travel angle of the refracted light on the basis of equation 3. If an inclination is formed equal to or more than the travel angle derived from equation 3 on the side surface of the rib of the entire periphery of the lens, the laser beam can almost be uniformly irradiated onto the welded region. If a laser beam with a beam diameter thermally uniform is irradiated onto the welded region, there will not be any significant variations in the temperature reached thereby making adhesion possible while effectively eliminating gaps.

Figure 2B:
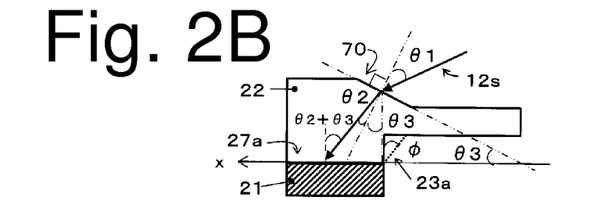

As shown in FIG. 2B, when the lens irradiation surface 70 is not parallel to the welded surface 27a, the travel angle of the refracted light can be derived by adding the angle of inclination θ3 of the lens irradiation surface 70 with respect to the welded surface 27a, to the angle of refraction θ2 at the lens irradiation surface 70. In other words, the laser beam 12s can be uniformly irradiated onto the welded surface 27a by the inclination angle φ of the side surface 23a of the rib 23 being equal to or more than the travel angle (θ2+θ3) of the refracted light. The angle of refraction θ2 at the lens irradiation surface 70 can be derived from equation 3 based on a height D' up to the light source on a second orthogonal coordinate system (not shown) corresponding to an x' y' plane and a distance L' up to the lens irradiation surface.

Figure 2C:
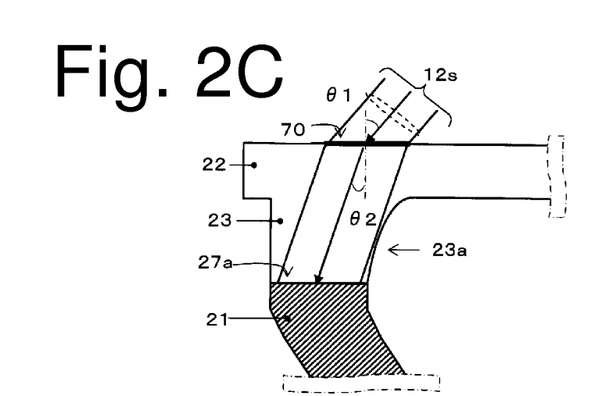

The side surface 23a of the rib 23 leaning with respect to the welded region 27a is not limited to being a flat surface. As shown in FIG. 2C, the side surface 23a of the rib 23 can be a curved surface.

Hereinafter, an exemplary embodiment of the welding process using a Galvano scanner on a workpiece that has a side surface of a rib leaning with respect to the welded region will be described.

Figure 3A:
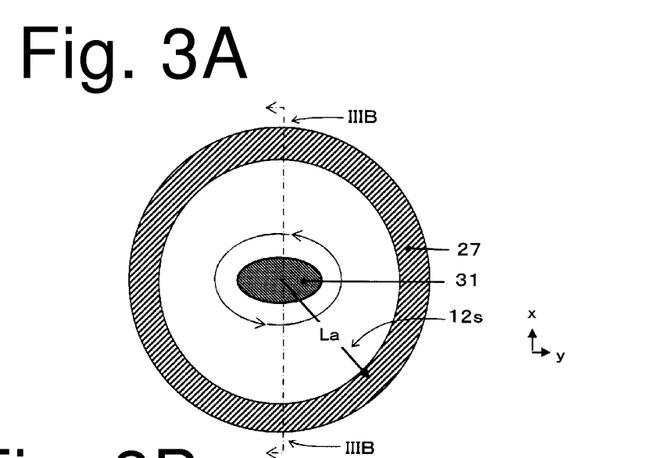
FIGS. 3A to 3C are plan views and a cross-sectional view showing a welding process accomplished by means of repeated irradiation of a laser beam onto a two-dimensional welded region.

FIG. 3A is a plan view of a workpiece that has a two-dimensional welded region as seen from above in the z axis. A scan head 31 can be arranged above the inside of circular-band shaped welded region at, for example, the center position in the z direction. The scan head 31 can include an optical system for adjusting the focal point, an x Galvano minor, a y Galvano mirror, and a controller such as shown in FIG. 1A. The laser beam 12s that has a beam diameter emitted from the scan head 31 can be repeatedly scanned in a loop. After setting up the workpiece, a laser beam irradiation can be received multiple times at the same position during a period of time in which the temperature of the resin member to be fused increases to a temperature at which a fused state can be achieved. For example, a laser beam irradiation can be received multiple times at the same position until the resin portion at the same position reaches the softening temperature (glass transition temperature) and a further laser beam irradiation can be received multiple times until reaching a fused state. The laser beam can use, for example, a YAG second or third harmonic laser, a semiconductor laser, a fiber laser, or the like. The laser beam spot diameter can be from 1 mm to 5 mm, for example. When the diameter of the laser beam is not sufficient for the width of the welded region, multiple welded lines which change positions in the radial direction can be set or a laser beam irradiation can be irradiated multiple times onto each welded line.

Figure 3B:
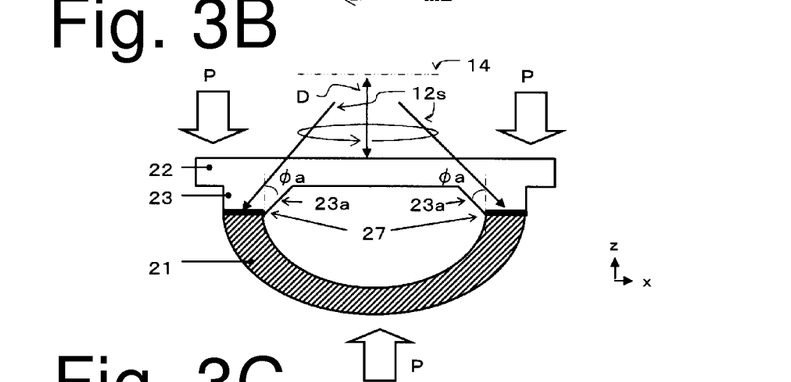

FIG. 3B is a cross sectional view taken along line IIIB-IIIB in FIG. 3A. A lens 22 formed from a light-transmitting resin can be arranged opposite to a housing 21 formed from a light-absorbing resin so as to close the opening of the housing 21. A rib 23 can be formed on the rear surface of the lens 22 and the inner side surface 23a of the rib 23 can be inclined at an angle φa equal to or more than the travel angle of the refracted light with respect to the normal of the welded region 27. The lower surface of the rib 23 and the upper surface of the housing 21 are brought into contact with each other under pressure by a pressure P along the z direction. The laser beam 12s can pass through the lens 22 and the rib 23, thereby irradiating the welded region 27 where the lower surface of the rib 23 is in contact with the upper surface of the housing 21. The laser beam 12s can be irradiated onto the welded region 27 without causing a shadow according to the inclination angle φa of the inner side surface 23a of the rib 23. By means of continuously forming the inclined inner side surface 23a of the rib 23 extending over the entire periphery of the lens 22, the laser beam can be uniformly irradiated onto the entire welded region. As a result, variations in the temperature reached can be relieved, gaps effectively eliminated, and a strong adhesion obtained.

When the shape of the welded region is a circular band and the light source is arranged at the center of the circular welded region, the inclination direction of the side surface of the rib will be equal to the irradiation direction of the laser beam. When the shape of the welded region is not a circular band or when the position of the virtual light source is shifted from above the center position of the welded region, it is possible for the side surface of the rib not to be in the irradiation direction of the laser beam but to lean in the direction of the width of the welded region. A description thereof will be next described.

Figure 3C:
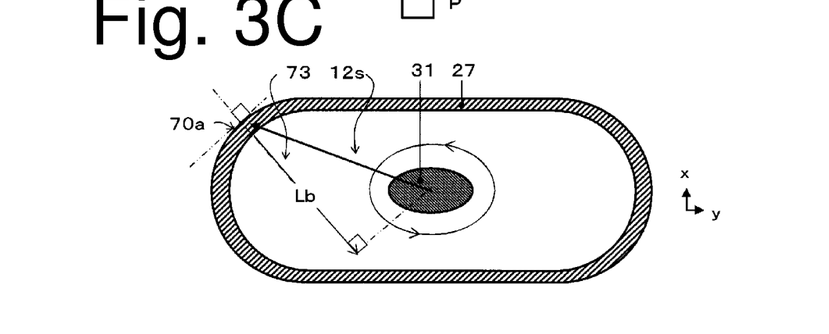

FIG. 3C is a top view showing the welded region in an oval-band shape arranged parallel to the xy plane. A scan head 31 is arranged above the inside of the oval-band shaped welded region 27, for example, above the center of gravity in the z direction. For this case, the inner side surface of the rib on the laser irradiation position 70a is formed leaning in the direction of the arrow 73 with respect to the normal Lb of the outer peripheral of the welded region or namely, leaning in the direction of the width of the welded region. By means of forming the inclined inner side surface of the rib in the direction of the width of the welded region of the entire periphery of the lens, the laser beam can be uniformly irradiated onto the entire welded region. As a result, variations in the temperature reached can be relieved, gaps effectively eliminated, and a strong adhesion obtained.

If the shape of the welded region significantly changes the distance from the virtual light source, the angle of incidence will change and the irradiation surface area will also change. If the laser beam is scanned at a constant speed, the incident energy per unit time and per unit area will change depending on the position and the temperature reached will also change. For this type of case, the scanning speed can be controlled depending on the angle of incidence or the distance from the virtual light source. The scanning speed can be reduced at a position where the incident energy density lowers, and accordingly, the temperature inside the welded region can be equalized. This type of control can be performed through the control unit 16 as shown in FIG. 1A.

The position of the light source is not limited to being above the inside of the welded region. Even if the light source is arranged above the outside of the welded region, it is possible to obtain effects similar to the exemplary embodiment when the side surface of the rib on the side where the light source is arranged is inclined.

If the refractive index of each medium is an already known value, the angle of inclination of the side surface of the rib can be derived by the height from the surface of the lens to be irradiated by the laser beam up to the light source and the distance from there up to the light source projected onto the surface of the lens. Therefore, even if the welded region has a three-dimensional structure, the effects according to the presently disclosed subject matter can be obtained.

Figure 4A:
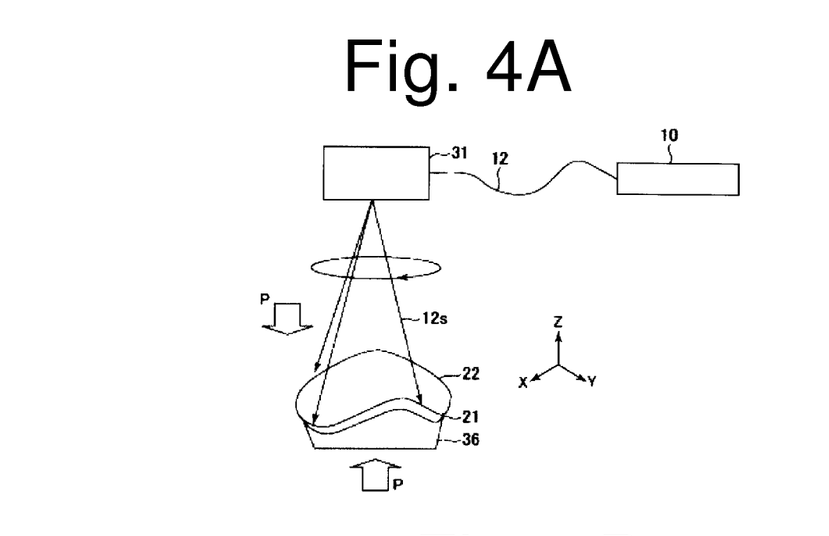
FIGS. 4A and 4B are a diagram and a cross sectional view showing a welding process accomplished by means of repeated irradiation of a laser beam onto a three-dimensional welded region.

FIG. 4A is a diagram schematically showing laser beam welding using three-dimensional scanning. The laser beam emitted from the laser oscillator 10 can be introduced into a scan head 31 through an optical fiber 12. For example, a housing 21, formed from a light-absorbing resin, can be arranged in a jig 36 supported on a horizontal plane. The welded region of the housing 21 has a three-dimensional structure that does not fit into a two-dimensional plane. A lens 22 can have a welded region that is compatible with the welded region of the housing 21 and can be formed from a light-transmitting resin. The lens 22 can be arranged on the opposite housing 21 where both the welded regions of the housing 21 and the lens 22 are brought into contact with each other. The lens 22 and the housing 21 can be pressurized by a pressure P in the direction where that makes close contact with each other. The scan head 31, which is arranged above the inside of a loop-shaped welded region such as above the center of gravity in the z direction, can scan the welded region with the laser beam 12s and repeatedly irradiate the welded region with the laser beam 12s. Galvano mirrors 14 and 15 can control the position of the laser beam inside the two-dimensional plane and the focal point distance in the z direction can be controlled by a focal point adjustment optical system to maintain a constant focused state.

Figure 4B:
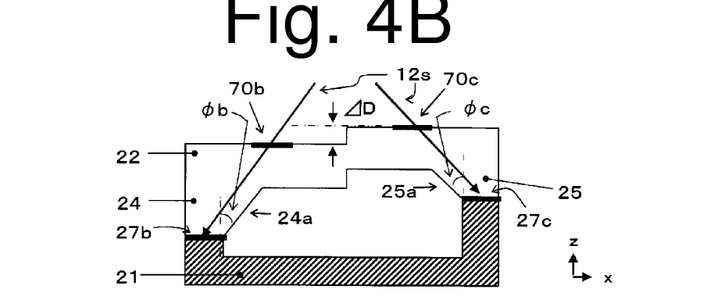

FIG. 4B is a cross-sectional view schematically showing a welded region with a three-dimensional structure. The lens 22 can be arranged so as to close the opening of the housing 21. A rib 24 can be formed on one side of the rear surface of the lens 22 and the inner side surface 24a of the rib 24 can be inclined at an angle φb equal to or more than the travel angle of the refracted light with respect to the normal of the welded surface 27b. Another rib 25 can be formed on another side of the rear surface of the lens 22 and the inner side surface 25a of the rib 25 can be inclined at an angle φc equal to or more than the travel angle of the refracted light with respect to the normal of the welded surface 27c. The laser beam 12s can pass through the irradiation surfaces 70b and 70c and the ribs 24 and 25 on the lens 22 and irradiate the welded surfaces 27b and 27c (contact surface between the ribs 24 and 25 and the housing 21). Because the height of the irradiation surface 70b is greater than the irradiation surface 70c by ΔD with respect to the light source, if the distance up to the light source is symmetric, the inclination angle φb will be smaller than the inclination angle φc. The inclination angles φb and φc allow the laser beam to be uniformly irradiated without causing shadows on the welded surface. As far as other welded surfaces in the welded region are concerned, if the inner side surface of the lens is formed at an angle equal to or more than the travel angle of the refracted light, the laser beam will be uniformly irradiated onto the entire welded region. In conjunction with this, if the scanning speed of the Galvano mirrors and the focal point adjustment optical system can be controlled, the heating and fusing will be almost simultaneous while variations in the temperature reached will be relieved thereby making it possible to obtain an even stronger welding.

Since an optical interface can be formed on the surface of the light-transmitting resin member, when the laser beam is irradiated, the beam will be incident on the light-transmitting resin member and simultaneously be reflected. As the angle of incidence towards the light-transmitting resin member becomes larger, the reflected components of the laser beam will become larger and more noticeable. If the angle of incidence towards the surface of the light-transmitting resin member exceeds 70°, the incidence efficiency will drop greatly and will not be suitable for practical use in many cases. Because the refractive index for air of PMMA (which is commonly used as a light-transmitting resin member of a vehicle light) is approximately 1.49, the refractive angle corresponding to an angle of incidence of 70° will be approximately 40° according to equation 2. This suggests that if the inclination angle of the side surface of the rib is approximately 40° with respect to a reference plane, the conditions will be fulfilled.

When an angle of incidence towards the surface of the light-transmitting resin member is equal to or more than 70°, it is possible to use multiple laser light sources.

Figure 4C:
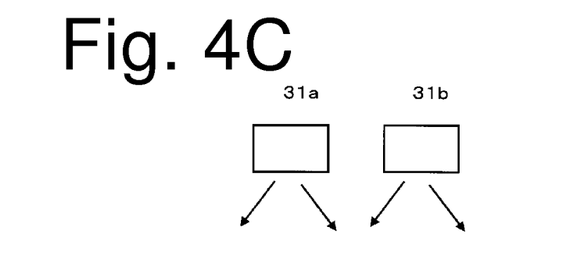
FIG. 4C is a diagram showing a modified example of the welding process accomplished by means of repeated irradiation of a laser beam onto a three-dimensional welded region.

FIG. 4C shows a mode in which multiple laser beams are simultaneously irradiated from multiple scan heads 31a and 31b. The scan heads 31a and 31b can also receive a laser beam from a separate laser light source or a laser beam can be received that has been divided from laser beams from one laser light source. By means of dividing the irradiation region, the laser irradiation region to be scanned by one scan head is limited thereby lowering the angle of incidence and making it possible to expand the laser irradiation region.

Although the foregoing was described from specific exemplary embodiments, the presently disclosed subject matter is not limited to these. For example, a combination of a light-transmitting resin member and a light-absorbing resin member is not limited to a lens and a housing. It can also be prepared for a showcase for jewelry and other small valuables and various other structures that benefit from a clear lens welded to a base housing.

The shape of the welded region is not limited to the shape shown in the above exemplary embodiments. If the travel angle of the refracted light can be estimated from geometric parameters in each welded surface with an arbitrary shape, it would be possible to determine the angle of inclination of the side surface of a rib that allows the welded region to be uniformly irradiated by the laser beam.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A method for manufacturing a resin molding, the method comprising:
providing a light-transmitting resin member having a loop-shaped protruding portion formed on a rear surface of the light-transmitting resin member and having a loop-shaped end surface, the protruding portion having inner and outer side surfaces each configured with an asymmetric inclination angle with respect to a normal of the end surface of the protruding portion;
pressing the loop-shaped end surface of the protruding portion that is a loop-shaped welded region of the light-transmitting resin member, and a loop-shaped welded region of a corresponding light-absorbing resin member, together so that the loop-shaped welded regions are opposed to each other, and then causing a laser beam emitted from a laser light source to be incident on a surface of the light-transmitting resin member while the laser beam is refracted, the laser light source being positioned above and inside the loop-shaped welded regions; and
repeatedly irradiating the laser beam onto the loop-shaped welded regions to heat and fuse the entire loop-shaped welded regions to weld the light-transmitting resin member and the light-absorbing resin member while opposed to each other and pressed together, wherein
the inclination angle of the inner side surface of the protruding member near the laser light source is equal to or more than a travel angle of the refracted laser beam and is over 0° and equal to or less than 40° so that an optical path within the light-transmitting member through which the laser light travels is not hindered and the entire loop-shaped welded regions are irradiated with the laser light without a shadow, and
wherein repeatedly irradiating the laser beam includes scanning the laser beam using a Galvano scanner so that a laser beam irradiation is received multiple times at the loop-shaped welded regions of the light-transmitting resin member and the light-absorbing resin member until they reach the softening temperature thereof from temperatures before irradiation and a further laser beam irradiation is received multiple times at the loop-shaped welded regions of the light-transmitting resin member and the light-absorbing member until they reach a fused state, thereby heating the entire loop-shaped welded regions substantially uniformly at substantially the same time.

2. The method for manufacturing a resin molding according to claim 1, wherein the inner side surface of the protrusion near the laser light source is a curved surface.

3. The method for manufacturing a resin molding according to claim 2, wherein repeatedly irradiating the laser beam includes varying a scanning speed of the laser beam to equalize heating temperatures within the loop-shaped welded region when an angle of incidence of the laser beam on the loop-shaped welded region is varied depending on a position where the laser beam is incident.

4. The method for manufacturing a resin molding according to claim 2, wherein repeatedly irradiating the laser beam includes utilizing a plurality of laser beams to equalize heating temperatures within the loop-shaped welded region when an angle of incidence of the laser beam on the loop-shaped welded region is varied depending on a position where the laser beam is incident due to a single laser beam being utilized.

5. The method for manufacturing a resin molding according to claim 2, wherein repeatedly irradiating the laser beam includes varying a scanning speed of the laser beam to equalize heating temperatures within the loop-shaped welded region when an angle of incidence of the laser beam on the loop-shaped welded region is varied depending on a position where the laser beam is incident.

6. The method for manufacturing a resin molding according to claim 5, wherein repeatedly irradiating the laser beam includes utilizing a plurality of laser beams to equalize heating temperatures within the loop-shaped welded region when an angle of incidence of the laser beam on the loop-shaped welded region is varied depending on a position where the laser beam is incident due to a single laser beam being utilized.

7. The method for manufacturing a resin molding according to claim 1, wherein repeatedly irradiating the laser beam includes utilizing a plurality of laser beams to equalize heating temperatures within the loop-shaped welded region when an angle of incidence of the laser beam on the loop-shaped welded region is varied depending on a position where the laser beam is incident due to a single laser beam being utilized.

8. The method for manufacturing a resin molding according to claim 1, wherein the repeatedly irradiating the laser beam is performed such that the temperature of the welded regions rises for a single laser beam irradiation and starts to fall after the completion of the irradiation, and before cooling to the temperature before the irradiation, the next laser beam is irradiated and the temperature rises again so that an average temperature gradually rises by means of the repeated laser beam irradiation at the entire welded region.

9. A method for manufacturing a resin molding, the method comprising:
providing a light-transmitting resin member having a loop-shaped protruding portion formed on a rear surface of the light-transmitting resin member and having a loop-shaped end surface, the protruding portion having an outer side surface and an inner side surface each configured with a different inclination angle with respect to a normal of the end surface of the protruding portion;
providing a laser light source using a Galvano scanner that is substantially centered above and along a substantially centered z-axis of the light-transmitting resin member;
pressing the loop-shaped end surface of the protruding portion that is a loop-shaped welded region of the light transmitting resin member, and a loop-shaped welded region of a corresponding light-absorbing resin member, together so that the loop-shaped welded regions are opposed to each other, and then causing a laser beam emitted from the laser light source to be incident on a surface of the light-transmitting resin member while the laser beam is refracted; and
repeatedly irradiating the laser beam onto the loop-shaped welded regions to heat and fuse the entire loop-shaped welded regions to weld the light-transmitting resin member and the light-absorbing resin member while opposed to each other and pressed together,
wherein the inner side surface is located closer to the substantially centered z-axis of the light-transmitting resin member than the outer side surface and the inclination angle of the inner side surface of the protruding member is equal to or more than a travel angle of the refracted laser beam, and wherein
the inclination angle of the inner side surface of the protruding member near the laser light source is over 0° and equal to or less than 40° so that an optical path within the light-transmitting member through which the laser light travels is not hindered and the entire loop-shaped welded regions are irradiated with the laser light without a shadow.

10. The method for manufacturing a resin molding according to claim 9, wherein the repeatedly irradiating the laser beam is performed such that the temperature of the welded regions rises for a single laser beam irradiation and starts to fall after the completion of the irradiation, and before cooling to the temperature before the irradiation, the next laser beam is irradiated and the temperature rises again so that an average temperature gradually rises by means of the repeated laser beam irradiation at the entire welded region.

11. The method for manufacturing a resin molding of claim 9, wherein the loop-shaped welded regions are substantially horizontally opposed to each other.

12. The method for manufacturing a resin molding of claim 9, wherein the laser beam is rotated about the substantially centered z-axis of the light-transmitting resin member.

13. The method for manufacturing a resin molding according to claim 9, wherein the inner side surface of the protrusion near the laser light source is a curved surface.

14. The method for manufacturing a resin molding according to claim 9, wherein repeatedly irradiating the laser beam includes varying a scanning speed of the laser beam to equalize heating temperatures within the loop-shaped welded region when an angle of incidence of the laser beam on the loop-shaped welded region is varied depending on a position where the laser beam is incident.

15. The method for manufacturing a resin molding according to claim 9, wherein repeatedly irradiating the laser beam includes utilizing a plurality of laser beams to equalize heating temperatures within the loop-shaped welded region when an angle of incidence of the laser beam on the loop-shaped welded region is varied depending on a position where the laser beam is incident due to a single laser beam being utilized.

16. A method for manufacturing a laser welded molded structure, the method comprising:
providing a light-transmitting lens member having an upper surface and rear surface, a loop-shaped protruding portion formed on the rear surface of the light-transmitting lens member, the protruding portion having an inner side surface, an outer side surface, and a loop-shaped end surface joining the inner side surface and outer surface, the loop-shaped end surface defining a loop-shaped welding region that forms a 360 degree track about a z-axis;
providing a housing portion with a corresponding loop-shaped end surface defining a loop-shaped welding region;
contacting the loop-shaped welding region of the protruding portion with the loop-shaped welding region of the housing;
providing a laser light source positioned above and inside the loop-shaped welding regions;
irradiating both the loop-shaped welding region of the protruding portion and the loop-shaped welding region of the housing portion simultaneously, while the loop-shaped welding regions are contacting each other, with laser light from the laser light source in a manner such that the laser light passes through the upper surface of the lens member and remains within the lens member until passing through both the loop-shaped welding region of the lens member and loop-shaped welding region of the housing portion substantially simultaneously; and
repeatedly irradiating the laser light onto the loop-shaped welded regions and along the track about the z-axis to heat and fuse the loop-shaped welded regions to weld the lens member and the housing,
wherein repeatedly irradiating the laser beam includes scanning the laser beam using a Galvano scanner so that a laser beam irradiation is received multiple times at the loop-shaped welded regions of the light-transmitting resin member and the light-absorbing resin member until they reach the softening temperature thereof from temperatures before irradiation and a further laser beam irradiation is received multiple times at the loop-shaped welded regions of the light-transmitting resin member and the light-absorbing member until they reach a fused state, thereby heating the entire loop-shaped welded regions substantially uniformly at substantially the same time, and wherein the inner side surface of the protruding portion is formed at a first angle with respect to the z-axis and forming the outer side surface of the protruding portion at a second angle with respect to the z-axis, wherein the first angle is different than the second angle such that laser light remains within the lens member and intersects only the upper surface and welding region of the lens member.

17. The method for manufacturing a laser welded molded structure according to claim 16, wherein the repeatedly irradiating the laser beam is performed such that the temperature of the welded regions rises for a single laser beam irradiation and starts to fall after the completion of the irradiation, and before cooling to the temperature before the irradiation, the next laser beam is irradiated and the temperature rises again so that an average temperature gradually rises by means of the repeated laser beam irradiation at the entire welded region.

* * * * *